Jan. 13, 1942.  W. BORSTEL  2,269,617
LIQUID TANK OR CONTAINER FOR USE IN VEHICLES AND AIRCRAFT
Filed March 11, 1938
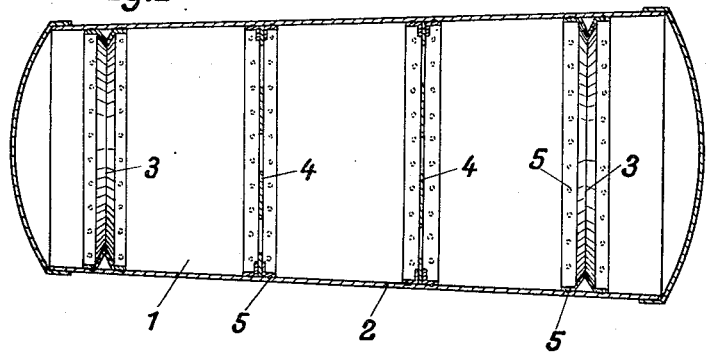
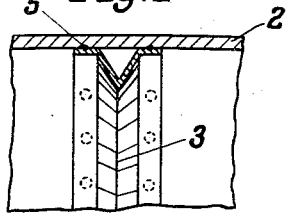 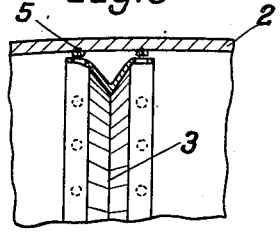
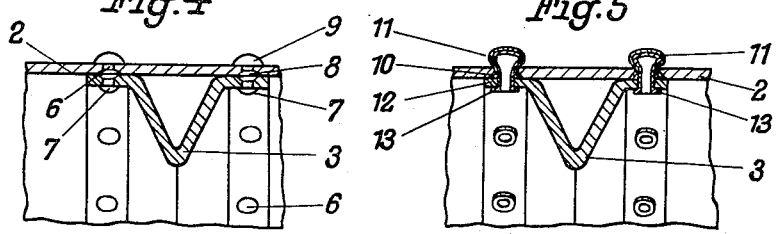
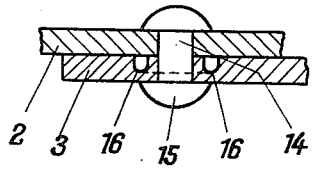 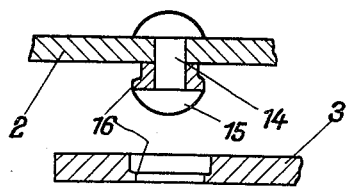
Inventor:
Walter Borstel
by Michaelis & Michaelis
Attys.

Patented Jan. 13, 1942

2,269,617

UNITED STATES PATENT OFFICE 2,269,617

LIQUID TANK OR CONTAINER FOR USE IN VEHICLES AND AIRCRAFT

Walter Borstel, Dessau-Siedlung, Germany, assignor to Junkers Flugzeug-und-Motorenwerke Aktiengesellschaft, Dessau, Germany Application March 11, 1938, Serial No. 195,263
In Germany March 20, 1937

6 Claims. (Cl. 220—71)

My invention relates to containers or tanks for liquids such as liquid fuel or oil and more especially to tanks mounted on vehicles and aircraft. In the containers of this kind as hitherto used, the wall was made very thin in order to save weight. Since the thin wall possessed only a low rigidity, it was braced by members such as transverse partitions or baffle plates arranged in the container.

However, when the craft changes its direction or is accelerated, the mass effects exerted by the liquid on the connections between the container wall and the bracing members, partitions or plates may become so great that the connections are destroyed. In containers of a known kind the thickness of the container wall and of the bracing members has been so chosen that the wall is weaker and less resistive against transversely acting forces at the points of connection, than these members. Consequently, in the case of excessive stressing of the connection this latter will break in a manner such that the container wall is torn with resulting leakage.

In the container or tank according to this invention the wall will not be affected by the destruction, occasioned by an excessive strain on the connections between the wall and the bracing members, transverse partitions or baffle plates. I obtain this by so arranging the connection that when it is destroyed, the connecting members or the bracing members, partitions or baffle plates will break, but not the container wall.

If the connection between the wall and the bracing members or the like is effected by means of rivets or screw bolts, these rivets or bolts are preferably formed, at the portions projecting beyond the container wall, with a breaking or safety part and are so dimensioned that they will retain their seat in the perforation of the wall also after breakage. In the case of rivets this is attained preferably by an enlargement of that part of the rivet hole of the wall which adjoins the bracing member. Into this enlargement some of the material of the rivet shaft is forced during the upsetting of the rivet, so that if breakage occurs, the part of the rivet shaft filling the hole in the wall of the container is reta'ned in the hole by the rivet head and by the material forced into the enlargement of the hole.

I may also form the rivet connection in such manner that the rivet holes in the container wall are closed by means of hollow rivets fixed to the wall and closed at one end, the cavities of these rivets being filled by auxiliary rivets which constitute the connection proper between the container wall and the bracing members, partitions or baffle plates. These auxiliary rivets are so formed that, whenever the connection is excessively stressed, they become detached from the bracing members, partitions or baffle plates or from the hollow rivets, which latter remain seated in the rivet holes after the connection has been severed.

If the bracing members, partitions or baffle plates are connected to the container wall by electric resistance welding, these parts are so dimensioned, at the connecting points, at which they are in contact with equally directed surfaces, that after the welding the parts of the container wall possess a greater resistivity against transversely active forces than the adjoining parts of the walls of the bracing members, partitions or plates. In that case, when the connection is destroyed, the material surrounding the weld will be torn from the partitions, plates or bracing members, or the break will form in the material which was liquid during the welding process, but in no case can holes be formed in the container wall. Preferably in such a case the container wall and the bracing members, partitions or baffle plates are made of the same material, and the container wall is made thicker than the walls of the bracing members, partitions or baffle plates at the point of connection.

I may, however, also avoid leakage of the container under excessive stresses acting on its wall by forming the bracing members, partitions or baffle plates, preferably near the point where they are connected to the wall, with breaking or safety parts. In that case the break does not occur at the connecting points, but at the bracing members themselves, the safety parts of which are so formed that the break occurs before the connection is destroyed.

In the drawing affixed to this specification and forming part thereof several embodiments of my invention are illustrated diagrammatically by way of example.

In the drawing,

Fig. 1 is a longitudinal section of a tank or container, the wall of which is connected by electrical resistance welding with bracing members and baffle plates, Fig. 2 being an enlarged view of a connection between the wall and a bracing member, while Fig. 3 is a similar view of the same parts after the connection has been destroyed.

Figs. 4 and 5 are similar views drawn to a larger scale of rivet connections between the container wall and the bracing member, Fig. 4 showing solid and Fig. 5 hollow rivets.

Figs. 6 and 7 are cross sections, drawn to a larger scale, of a connection between the wall and a bracing member before and after destruction, the bracing member being here formed with a safety place.

Referring to the drawing and first to Figs. 1-3, 1 is a closed tank or container, which may be made of a light metal, and usually has a relatively thin wall or shell 2 with heads 2a mounted upon its extremities. 3 and 4 are bracing members and baffle plates, respectively, fixed to the inner surface of the container wall in order to reinforce it. In the modification illustrated in Figs. 1-3, the wall 2, members 3 and the plates 4 are made of the same material and are connected by means of electrical resistance welding. In order to prevent the connection from being torn under formation of a hole in the wall, the wall is made thicker than the bracing members 3 and the plates 4 at the places where they are connected with each other. If these connections should be destroyed by excessive mass forces exerted by the liquid, the wall 2, as shown in Fig. 3, will not be damaged, but the material surrounding the weld 5 will be torn from the bracing members 3 or the baffle plates 4.

In the embodiment shown in Fig. 4 the bracing member 3 is connected with the container wall 2 by means of rivets 6 which are formed near the member 3 with weak safety portions, for instance with particularly weak heads 7. Moreover, provision is made therefor that after breaking the rivets 6 will be firmly retained in the rivet holes of the wall 2 in order to prevent leakage. To this end the rivet holes are enlarged at 8 at the joint between the wall 2 and the member 3. During the riveting process part of the material of the rivet shaft is forced into this enlargement, so that on the rivet 6 breaking the rivet head 9 and the material filling the enlargement 8 will be retained in the holes of the wall.

In the modification shown in Fig. 5 hollow rivets 10 with enlarged head portions 11 are firmly seated in the rivet holes of the wall 2. Into the cavities of the rivets 10 are forced the rivets 12, which grip the wall of the member 3 and thus connect the member 3 with the wall 2. When this connection is unduly stressed, the rivets 12 are torn either from the cavities of the hollow rivets 10 surrounding them, or, after destruction of their beaded ends 13, from the bracing members 3. The hollow rivets 10 are firmly retained, after destruction of the connection, in the perforations of the container wall 2, so that this wall will not leak.

In the modification shown in Figs. 6 and 7 the wall 2 is connected with the bracing member 3 by means of rivets 14, and the member 3 is formed, at 16 near the edge of the rivet head 15, with a weak safety place (a groove). When the wall 2 is unduly stressed, the break will occur at the bracing member 3 (Fig. 7).

The bracing members 3 may also be arranged on the outside of the container wall 2 and be connected with it in such manner that, if the connection should be destroyed by forces acting from the outside, the wall is not torn and leakage is prevented.

In the claims the term "bracing member" is intended to include also the partitions and baffle plates mentioned above.

I wish it to be understood that I do not desire to be limited to the exact details of construction shown and described, for obvious modifications will occur to a person skilled in the art.

I claim:

1. The combination of a closed tank having a wall, a brace member within said tank having a portion in face contacting relation with the wall, spaced connecting means secured directly to said face contacting portions of the brace and of the wall and securing the two together, each of said means being secured directly to an area of said brace portion and an area of said wall portion, the relative strength of each of said areas and its respective securing means being such that excess strain at the point of securement first ruptures the secured area of the brace member, thereby leaving a series of spaced holes therein and freeing the brace from the wall without rupturing the latter.

2. The arrangement set forth in claim 1 wherein the face contacting portions of the wall and brace member are provided with aligned apertures through which the spaced connecting means extend.

3. The arrangement set forth in claim 1 wherein the face contacting portions of the wall and brace member are provided with aligned apertures through which the spaced connecting means extend, each connecting means including means cooperable with said wall portion for preventing displacement of the portions of the connecting means extending through the wall after rupture has occurred, thereby preventing leakage.

4. The arrangement set forth in claim 1 wherein the connecting means are rivets having weak heads bearing against the bracing member and enlarged portions intermediate the bracing member and the wall.

5. The arrangement set forth in claim 1 wherein the connecting means are welds and the metal of said bracing member at each weld is thinner than that of the corresponding portion of the wall.

6. The arrangement set forth in claim 1 wherein the connecting means are rivets and the metal of the bracing member around each rivet is weakened.

WALTER BORSTEL.